Feb. 20, 1945.   J. R. LONG   2,370,055
ESTERIFICATION
Filed Aug. 25, 1942
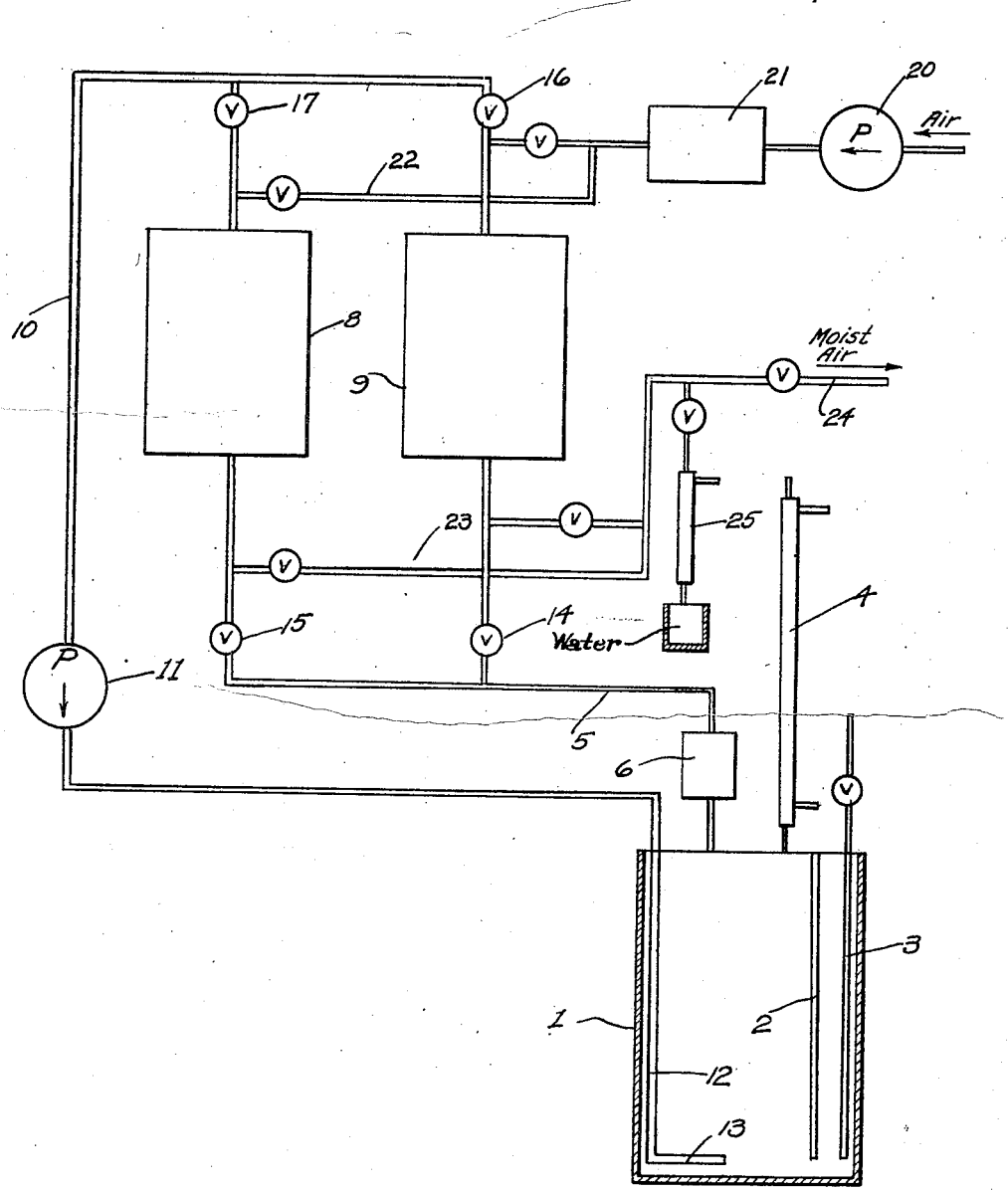
Inventor
John R. Long
By
Attorney Patented Feb. 20, 1945

2,370,055

UNITED STATES PATENT OFFICE 2,370,055

ESTERIFICATION

John R. Long, Stow, Ohio, assignor to Wingfoot Corporation, Akron, Ohio, a corporation of Delaware Application August 25, 1942, Serial No. 456,088

5 Claims. (Cl. 260—485)

This invention relates to an improved process for the production of high boiling esters of aliphatic alcohols boiling below 100° C. The invention is applicable to the production of esters which have a substantially higher boiling point than the alcohols from which they are made.

In order to make the alcohol react rapidly with the acid it is necessary to keep the reaction mixture dry. According to this invention this is accomplished by continuously introducing a large volume of anhydrous alcohol vapors under the surface of the reaction mixture maintained at a temperature above the boiling point of the alcohol and continuously removing the wet alcohol vapor until the reaction is complete. Heretofore, the wet alcohol vapors from such a reaction have been either condensed and the liquid dried by conventional methods or the wet vapors have been dried in the vapor state and then condensed. The liquid anhydrous alcohol is then vaporized, and the vapors are introduced into the reaction mixture. These methods of handling the wet alcohol vapors are satisfactory for laboratory experiments. The process of this invention is a plant process in which the wet alcohol vapors from such a reaction are dried in a vapor state, and the resulting dry alcohol vapors are returned to and forced into the reaction mixture. In this process there is a saving in heat required to carry out the reaction since the wet alcohol vapors are dried, and the dry alcohol vapors are returned to the reaction mixture without being condensed and then vaporized again.

The invention will be further described in connection with the accompanying drawing, which is largely diagrammatic. The reaction vessel 1 is supplied with a thermometer well 2 and a leg 3 for introducing alcohol and taking samples for analysis, etc. The reflux condenser 4 is open to the atmosphere. This serves as a safety valve. The vapor outlet 5 is provided with a trap 6 for the separation of entrained liquid which is returned to the reaction vessel. The vapors are conducted through the pipe 5 to either one or the other of the dehydrators 8 and 9. After passing through one of these dehydrators, the vapors are returned through the pipe 10 by the vapor pump 11 to the reaction vessel. The inlet pipe 12, by which they are returned, goes almost to the bottom of the reaction vessel, and the L portion 13 is perforated with small holes for the introduction of the dried vapors under the surface of the reaction mixture.

The valves 14, 15, 16, and 17 control the flow of vapors through either one or the other of the dehydrators 8 and 9. But one dehydrator is used at a time. If, for example, the valves 15 and 17 are open and the valves 14 and 16 are closed, wet alcohol vapor is passed through the dehydrator 8. After this dehydrator has taken up sufficient water to slow down the rate of dehydration, the dehydrator is preferably taken out of operation, and the other dehydrator 9 is put into operation. Of course, if preferred, the use of the dehydrator may be continued and the rate of passage of the vapors through it may be reduced.

When the dehydrator 8 is taken out of commission and the dehydrator 9 is put into use, hot air is blown through the dehydrator to remove the water from it and make it ready for further use. This air is blown by the pump 20 through the heater 21 and then through the line 22, through the dehydrator, and back through the line 23 either to the outlet 24 which is open to the atmosphere or to the condenser 25. Appropriate valves are provided for conducting this operation.

By the time that the dehydrator 9 is ready for dehydration, the dehydrator 8 is ready to be put back into service. Then by proper adjustment of the valves shown, hot air is blown through the valve 9 by means of the pump 20, and the resulting moist air is either vented to the atmosphere through the pipe 24 or passed through the condenser 25. Thus, by using two dehydrators the conversion of anhydride to ester may be made continuous.

It is desirable to insulate all parts of the apparatus, except the condensers, to conserve heat; and if necessary, the driers 8 and 9 should be heated to prevent the condensation of vapor in them.

Variations in the apparatus, of course, are possible by varying the nature of the dehydrating agent employed, the construction of the dehydrators, the arrangement of the pumps, valves, etc. The monoester or diester of a polybasic acid may be formed.

In one installation twenty-three pounds of granular anhydrous calcium sulfate were used as the drying agent. Eight and seventy-eight one-hundredths pounds of chloromaleic anhydride and 30 cc. of sulfuric acid were placed in the reaction vessel 1. Two pounds of methanol were added. The vapor system was raised to the operating temperature with steam. After the initial reaction in the vessel 1 subsided, the methanol was added to the reaction mixture to bring the temperature to a range of 80 or 90 to 100° C. at which there was gentle refluxing. The vapor pump 11 was then started. As the reaction proceeded, more methanol was added so that there was always enough for gentle refluxing. A total of 5.50 pounds of methanol was added. After a few hours a substantially complete conversion to dimethyl monochloromaleate was effected. The excess methanol was distilled off, and the ester was worked up in the usual manner.

Similarly, 5.40 pounds of maleic anhydride and 25 cc. sulfuric acid were placed in the reaction vessel with 3 pounds of 98 per cent ethyl alcohol. The process was carried out as in the preceding example. After several hours the reaction was substantially complete. If 95 per cent alcohol is added, there will be a larger recovery of water from the dehydrators, and the reaction may necessarily be slowed down somewhat.

In a third example, 21.2 pounds of chloromaleic anhydride was esterified with 95 per cent ethyl alcohol. Using 10 cc. of sulfuric acid in the reaction vessel, the esterification proceeded slowly. When 40 cc. more of sulfuric acid were added, the esterification proceeded rapidly. Substantially complete conversion to the ester was obtained.

The rate of the reaction depends upon various factors, as for example the capacity of the vapor pump, the capacity of the dehydrators, the temperature of the reaction mixture, the rate at which the alcohol is added, etc. Other drying agents than calcium sulfate may be employed. It will generally be desirable to add about 60 per cent of the theoretically required amount of alcohol to the anhydride at the start of the reaction. The process is very economical in the use of heat because the vapors are dried and returned to the reactor without being condensed. The only heat added to the reaction is that required for evaporation of the water to compensate for that lost through radiation and the heat necessary to regenerate the drier.

What I claim is:

1. In the process of esterifying an aliphatic alcohol boiling below 100° C. and an acid to produce an ester having a substantially higher boiling point, and liberating water, while heating the esterifying mass above the boiling point of the alcohol, the steps which comprise dehydrating vapors of water and alcohol thus vaporized and returning anhydrous alcohol without substantial condensation to the esterifying mass and below the surface thereof.

2. The process of esterifying a maleic anhydride with an alcohol which comprises heating a mixture of the alcohol and anhydride and a small amount of strong mineral acid above the boiling point of the alcohol, thereby producing ester and moisture and vaporizing wet alcohol from the reacting mass, and while maintaining the alcohol in the vapor state removing the water vapor and then returning the vapor of the dried alcohol to the reacting mass.

3. The process of esterifying a maleic anhydride with an alcohol which comprises heating a mixture of the alcohol and anhydride and a small amount of acid above the boiling point of the alcohol, thereby producing ester and moisture and vaporizing wet alcohol from the reacting mass, and while maintaining the alcohol in the vapor state removing the water vapor and then returning the vapor of the alcohol and ester under the surface of the reacting mass.

4. The process of esterifying a maleic anhydride with an alcohol which comprises mixing maleic anhydride, about 60 per cent of the amount of an alcohol required to convert it to the diester and a small amount of acid, refluxing these at a temperature above the boiling point of the alcohol, then while adding additional alcohol to the esterifying mass passing vapors of wet alcohol vaporized therefrom through a dehydrating medium to remove water therefrom without condensing vapors of the alcohol, returning these vapors to the esterifying mass by returning them below the surface thereof, and continuing the reaction until conversion to the diester is substantially complete.

5. The process of esterifying an alcohol and a maleic anhydride which comprises refluxing the alcohol and anhydride in the presence of a small amount of esterifying catalyst, and simultaneously withdrawing vapors from the refluxing mixture, dehydrating them, and returning them to the refluxing mixture near the bottom thereof.

JOHN R. LONG.